United States Patent
Yao et al.

(10) Patent No.: US 8,792,405 B2
(45) Date of Patent: Jul. 29, 2014

(54) ADAPTIVE BANDWIDTH FOR MEDIA CONTENT

(75) Inventors: Xuefeng Yao, Weston, MA (US); Zhiying Jin, Lexington, MA (US); Jack Jianxiu Hao, Lexington, MA (US); Yuhiu Qian, Lexington, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 283 days.

(21) Appl. No.: 13/296,544

(22) Filed: Nov. 15, 2011

(65) Prior Publication Data

US 2013/0121261 A1   May 16, 2013

(51) Int. Cl.
*H04W 4/00* (2009.01)
*H04W 72/08* (2009.01)

(52) U.S. Cl.
CPC .................. *H04W 72/085* (2013.01)
USPC ............... 370/312; 370/330; 370/331

(58) Field of Classification Search
None
See application file for complete search history.

(56) References Cited

U.S. PATENT DOCUMENTS

| | | | | |
|---|---|---|---|---|
| 6,611,503 | B1* | 8/2003 | Fitzgerald et al. | 370/260 |
| 6,973,037 | B1* | 12/2005 | Kahveci | 370/236 |
| 8,099,480 | B1* | 1/2012 | Muthusrinivasan et al. | 709/222 |
| 8,428,605 | B2* | 4/2013 | Pedersen et al. | 455/450 |
| 2002/0114309 | A1* | 8/2002 | Chow et al. | 370/347 |
| 2008/0101328 | A1* | 5/2008 | Shieh | 370/347 |
| 2010/0074190 | A1* | 3/2010 | Cordeiro et al. | 370/329 |
| 2011/0035462 | A1* | 2/2011 | Akella | 709/217 |
| 2011/0289391 | A1* | 11/2011 | Breiling et al. | 714/786 |
| 2012/0014332 | A1* | 1/2012 | Smith et al. | 370/329 |

* cited by examiner

*Primary Examiner* — Jeffrey M Rutkowski
*Assistant Examiner* — Hardikkumar Patel

(57) ABSTRACT

A system is described with one or more server devices to: receive an instruction to provide particular content; determine that a new channel is requested to provide the particular content; determine a first portion of bandwidth assigned to existing channels; allocate a second portion of the bandwidth for the new channel; provide the new channel in the second portion of the bandwidth; and provide the particular content on the new channel.

22 Claims, 10 Drawing Sheets

Fig. 1
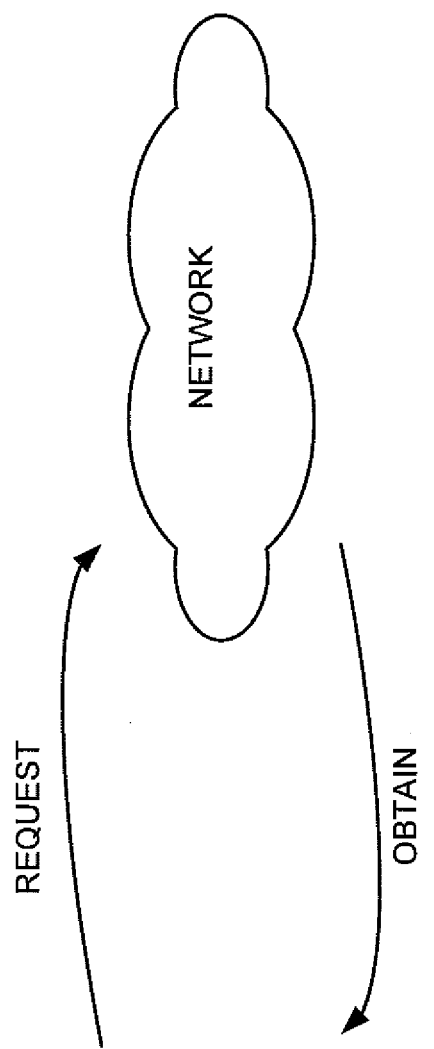

ADAPTIVE BANDWIDTH FOR MEDIA CONTENT

BACKGROUND

Content providers, such as wireless telephone service providers, permit users to obtain media content, such as video content and/or audio content, on their mobile devices. Media content can be provided via multicasting or broadcasting from point to multipoint streaming, or via unicasting from point to point streaming.

BRIEF DESCRIPTION OF THE DRAWINGS

FIG. 1 is a diagram of an overview of an implementation described herein;

DETAILED DESCRIPTION OF PREFERRED EMBODIMENTS

The following detailed description refers to the accompanying drawings. The same reference numbers in different drawings may identify the same or similar elements.

FIG. 1 is a diagram of an overview of an implementation described herein. As shown in FIG. 1, a mobile device can request and obtain content from a network for wireless presentation on the mobile device. As wireless bandwidth demand continues to increase as the demand for content through mobile devices increases, network congestion can occur because wireless bandwidth is finite and can be subject to the limitations of communication technology. Additionally, due to the limits on bandwidth, the number of channels available can also be limited.

An implementation, which can potentially reduce network congestion, can include adaptive bandwidth allocation, where the bandwidth allocation for a channel can be adapted to a situation. For example, if there are more requests for one channel than another, then bandwidth can be allocated from a channel with fewer requests to a channel with more requests to increase the Quality of Experience (QoE) for those using the channel with more demand.

Another implementation can include another adaptive bandwidth allocation, where if a request for content that has not been assigned a channel yet, then one channel can be adaptively adjusted to decrease the bit rate of the one channel to create available bandwidth that can be used to form a new channel for obtaining content.

The description to follow will describe bandwidth as a finite sized transmission that is limited by technology that can be divided into channels. These channels can be described in terms of bandwidth or bit rate, where bandwidth is a bit rate measure of available resources. For example, a bandwidth can be divided into one or more channels, where each channel occupies a portion of the bandwidth and each channel has a bit rate associated with the amount of bandwidth assigned to the channel.

The description to follow will describe the content as video content, such as television content, movie content, gaming content, or the like. The term "video content," as used herein, is intended to include video data, which may or may not be combined with audio data, and may include any type of media content. While the description will focus on video content, the description is not so limited and may apply to other types of content, such as audio content (e.g., audio books, music, concerts, etc.).

Figure 2:
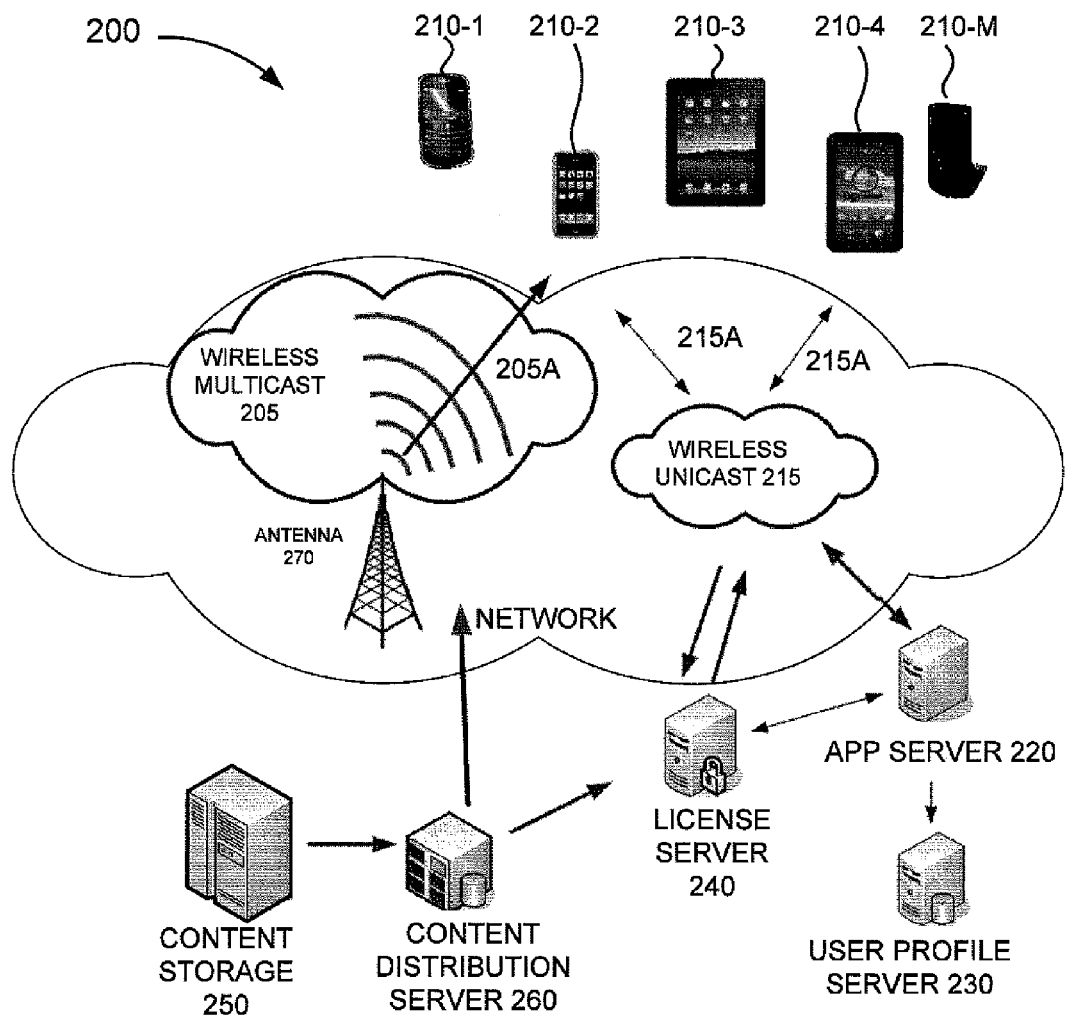
FIG. 2 is a diagram that illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include a network with: wireless multicast system 205 that sends multicast signals (e.g., multicast data packets) 205A; and wireless unicast system 215 that sends unicast signals (e.g., unicast data packets) 215A. Additionally, environment 200 may include an application server 220 (hereinafter referred to as "app server 220"); a user profile server 230; a license server 240; a content storage server 250; a content distribution server 260; and an antenna 270.

The network can communicate with mobile devices 210-1, 210-2, 210-3, 210-4, . . . , 210-M (where M≥1) (collectively referred to as "mobile devices 210," and individually as "mobile device 210") via multicast signals 205A and unicast signals 215A. While FIG. 2 shows a particular number and arrangement of devices, in practice, environment 200 may include additional, fewer, different, or differently arranged devices than are shown in FIG. 2. For example, each of servers 220-260 may be implemented as multiple, possibly distributed, devices. Alternatively, two or more of servers 220-260 may be implemented within a single device.

A network in the above implementation may generally include logic to provide wireless access for mobile devices 210. Through this network, mobile devices 210 may, for instance, communicate with one another (e.g., via a voice call), access services through IP network, and/or complete telephone calls through a traditional telephone network, such as a public switched telephone network (PSTN).

The network may be a network that provides a wireless (radio) interface to mobile devices 210 using the $3^{rd}$ generation (3G) mobile telecommunications standards. An implementation of 3G network may include one or more elements through which mobile devices 210 may wirelessly connect to receive telecommunication services.

The network may be a network that provides a wireless (radio) interface to mobile devices 210 using the $4^{th}$ generation (4G) mobile telecommunications standards. An implementation of 4G network may include one or more elements through which mobile devices 210 may wirelessly connect to receive telecommunication services. 4G networks can include a radio access network (e.g., a long term evolution (LTE) network or an enhanced high rate packet data (eHRPD) network) and a wireless core network (e.g., referred to as an evolved packet core (EPC) network). An LTE network is often called an evolved universal terrestrial radio access network (E-UTRAN). An EPC network can be an all-IP packet-switched core network that supports high-speed wireless and wireline broadband access technologies. An evolved packet system (EPS) is defined to include the LTE (or eHRPD) network and the EPC network.

Wireless multicast system 205, which may traverse the network, may include point-to-multipoint (PTM) transmissions, where transmissions of multicast channels 205A take place instantaneously from a single source (e.g., within the network) to multiple endpoints (e.g., mobile devices 210). Wireless multicast system 205 or broadcast systems can be used to multicast or broadcast content with adaptively adjustable channels. In one implementation, individual bandwidths for one or more of the multicast channels 205A can be adaptively adjusted, such that the bandwidth of one multicast channel 205A can be adjusted during transmission to increase or decrease video content quality without interrupting the transmission.

Wireless unicast system 215, which may also traverse the network, may include point-to-point transmissions of unicast signals 215A from the network to mobile device 210 or from mobile device 210 to the network. Wireless unicast signals 215A may be transmitted to allow for information to be transmitted to and from two single points (e.g., from the network to mobile device 210, and from mobile device 210 to the network).

In one implementation, individual bandwidths for one or more multicast channels 205A can be adaptively adjusted based upon information received from wireless unicast signals 215A. For example, if multiple wireless unicast signals 215A are directed to a particular video content, which can indicate high demand for a multicast channel 205A, then the multicast channel 205A can be adjusted for higher bandwidth or bit rate and thus higher quality or resolution of the video and possibly a higher QoE for more users through the higher bandwidth to more users.

In another implementation, factors, such as time of day, sporting events, or seasonal events, can be utilized to determine adjustments to channel bit rates. For example, bandwidth allocation can be increased for sporting events when the event is occurring by allocating higher bit rates for a channel during this time.

While the example wireless multicast system 205 and wireless unicast system 215 discussed herein may be provided over a cellular network, other networks may be used, such as a local area network (LAN), a wide area network (WAN) (e.g., the Internet), a metropolitan area network (MAN), an ad hoc network, a telephone network (e.g., a Public Switched Telephone Network (PSTN), or a voice-over-IP (VoIP) network), or a combination of networks. In one implementation, mobile device 210 may receive video content via a wireless LAN (WLAN) (e.g., Wi-Fi (wireless fidelity)), a wireless WAN (WWAN) (e.g., EVDO (evolution data optimized)), sideloading (e.g., a transfer between two local devices), or a cable (e.g., USB).

Mobile device 210 may include any portable device capable of communicating via a network. For example, mobile device 210 may correspond to a mobile communication device (e.g., a mobile phone or a personal digital assistant (PDA)), a portable computer device (e.g., a laptop or a tablet computer), or another type of portable device.

App server 220 is a backend support system, for a mobile application, that can support user authentication, and billing entitlement, as well as search and browse features of content catalogs. App server 220 may include a server device, such as a computer device, that provides a video content application or performs user authentication, content listing management, or order processing. For example, app server 220 may permit mobile device 210 to stream or download a video content application that may permit a user to find video content of interest or play downloaded or streaming video content. Additionally, or alternatively, app server 220 may provide video content metadata, such as lists or categories of video content. Additionally, or alternatively, app server 220 may authenticate a user who desires to purchase, rent, or subscribe to video content. In one implementation, the interactions between app server 220 and mobile device 210 may be performed using the hypertext transfer protocol (HTTP) or the secure HTTP (HTTPS). In another implementation, the interactions between app server 220 and mobile device 210 may be performed using another type of protocol.

User profile server 230 may include a server device, such as a computer device, to store user profile information for users. The user profile information may include various information regarding a user, such as login information (e.g., user identifier and password), billing information, address information, types of services or content to which the user has subscribed, a list of video content purchased by the user, a list of video content rented by the user, ratings of video content by the user, a device identifier (e.g., a mobile device identifier, a set top box identifier, or a personal computer identifier) for devices used by the user, a video content application identifier associated with the video content application obtained from app server 220, or the like. App server 220 may use the user profile information to authenticate a user and may update the user profile information based on the user's activity (with the user's express permission).

License server 240 may be used to validate, enforce, and issue Digital Rights Management (DRM) licenses. The license server 240 may include a server device, such as a computer device, that provides key and license management. For example, license server 240 may receive a request from a mobile device 210 for a license relating to video content that mobile device 210 is streaming or has downloaded. The license may include information regarding the type of use permitted by mobile device 210 (e.g., a purchase, a rental, or a subscription) and a decryption key that permits mobile device 210 to decrypt the video content. In one implementation, the communication between license server 240 and mobile device 210 may be conducted over a secure channel, may include public and private keys, or may include other forms of secure communication.

Content storage server 250 may include a server device, such as a computer device, or a storage device, such as a database, that stores or processes video content. For example, content storage server 250 may perform encoding operations on video content using, for example, public/private keys. Content storage server 250 may also perform transcoding operations on the video content. Content storage server 250 may store video content in encrypted form.

Content distribution server 260 may include a server device, such as a computer device, that delivers video content to mobile devices 210. For example, content distribution server 260 may permit a mobile device 210 to stream or download particular video content once the user, of mobile device 210, has been properly authenticated. The content distribution server 260 can transcode content into different formats for various mobile devices 210 to be able to play, and can also encrypt data using DRM technology to enforce digital rights licenses.

Content distribution server 260 may deliver content from content storage server 250 for use with a Video On Demand Service, or may deliver content from any other content source accessible to content distribution server 260. For example, the content distribution server 260 can distribute content from sources, such as a home-based DVR, a live television broadcast, internet portals, etc.

Antenna 270 may be any type of antenna that converts electric currents into radio waves, and radio waves into electric currents for transmitting and receiving, respectively. Antenna 270 may include several antenna elements that can be used individually or combined to synthesize several overlapping antenna beams spanning three-hundred and sixty (360) degrees in azimuth. For example, antenna 270 may include between four and eight antenna elements to achieve desirable antenna gains.

Figure 3:
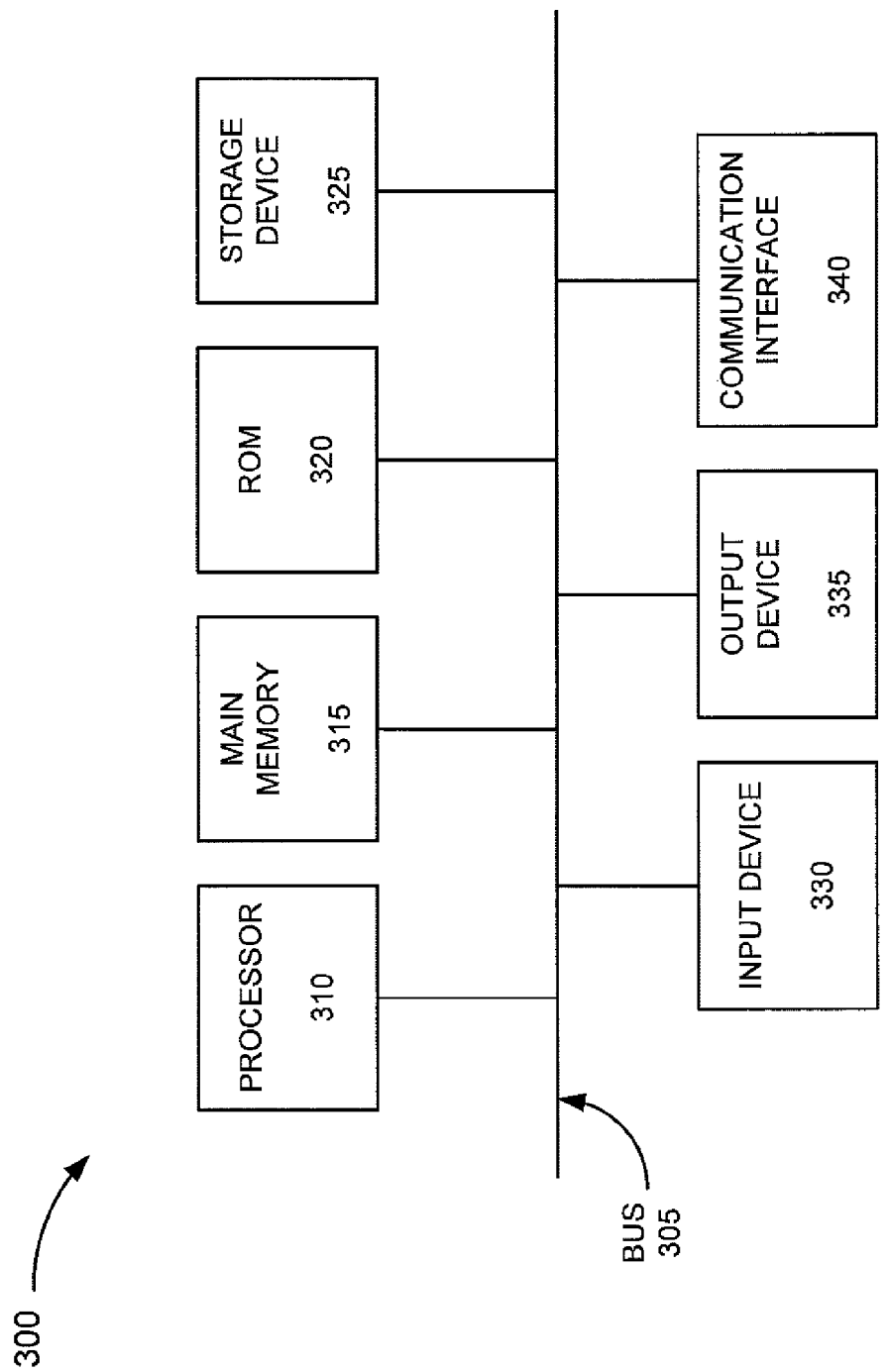
FIG. 3 is a diagram of example components of a device that may be used within the environment of FIG. 2.

FIG. 3 is a diagram of example components of a device 300. Device 300 may correspond to app server 220, user profile server 230, license server 240, content storage server 250, or content distribution server 260. Each of app server 220, user profile server 230, license server 240, content storage server 250, and content distribution server 260 may include one or more devices 300.

As shown in FIG. 3, device 300 may include a bus 305, a processor 310, a main memory 315, a read only memory (ROM) 320, a storage device 325, an input device 330, an output device 335, and a communication interface 340. In another implementation, device 300 may include additional, fewer, different, or differently arranged components.

Bus 305 may include a path, or collection of paths, that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices (e.g., mobile devices 210) or networks. In one implementation, communication interface 340 may include a wireless interface, or a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical memory device or spread across multiple physical memory devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
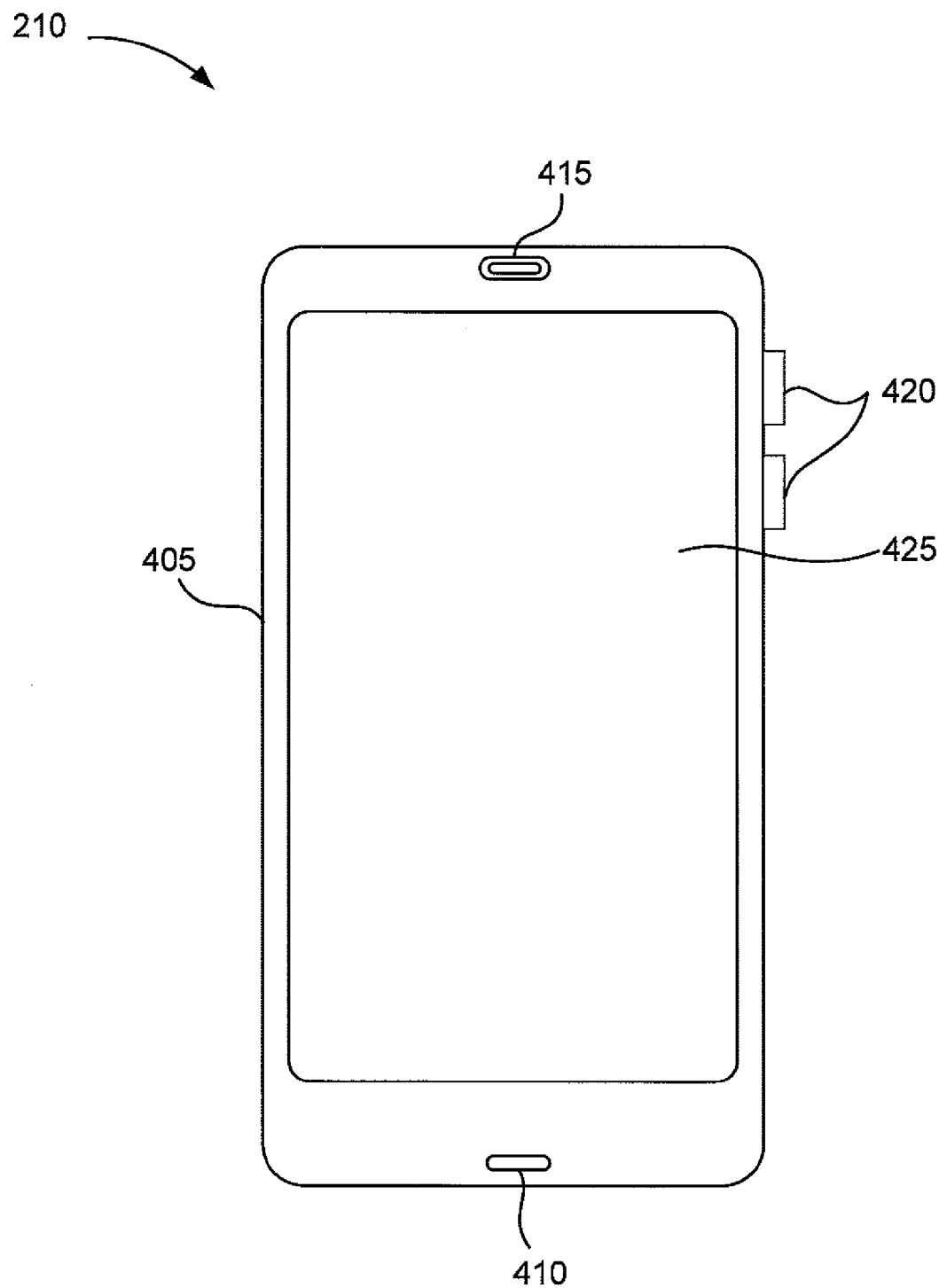
FIG. 4 is a diagram of an example mobile device of FIG. 2.

FIG. 4 is a diagram of an example implementation of mobile device 210. In the implementation shown in FIG. 4, mobile device 210 may correspond to a mobile communication device. Mobile device 210 may include a housing 405, a microphone 410, a speaker 415, buttons 420, and a display 425. In other implementations, mobile device 210 may include fewer, additional, different, or differently arranged components than those illustrated in FIG. 4 and described herein. For example, a keypad or other input device may be implemented on a touch screen of display 425 or on buttons 420.

Housing 405 may include a structure to contain components of mobile device 210. For example, housing 405 may be formed from plastic, metal, or some other material. Housing 405 may support microphone 410, speaker 415, buttons 420, and display 425.

Microphone 410 may include an input device that converts a sound wave to a corresponding electrical signal. For example, the user may speak into microphone 410 during a telephone call or to execute a voice command.

Speaker 415 may include an output device that converts an electrical signal to a corresponding sound wave. For example, the user may listen to music, listen to a calling party, or listen to other auditory signals through speaker 415.

Buttons 420 may include an input device that provides input into mobile device 210. Buttons 420 may include an input component to mobile device 210 to enter information, such as to access a camera feature, to access data, or to invoke a function or an operation. Buttons 420 can be implemented as physical keys on housing 405 or display 425, or virtual keys on a touch screen of display 425.

Display 425 may include an output device that outputs visual content, and/or may include an input device that receives user input (e.g., a touch screen (also known as a touch display)). Display 425 may be implemented according to a variety of display technologies, including but not limited to, a liquid crystal display (LCD), a plasma display panel (PDP), a field emission display (FED), a thin film transistor (TFT) display, a light emitting diode (LED) display, an organic light emitting diode (OLED) display, or some other type of display technology. Additionally, display 425 may be implemented according to a variety of sensing technologies, including but not limited to, capacitive sensing, surface acoustic wave sensing, resistive sensing, optical sensing, pressure sensing, infrared sensing, gesture sensing, etc. Display 425 may be implemented as a single-point input device (e.g., capable of sensing a single touch or point of contact) or a multipoint input device (e.g., capable of sensing multiple touches or points of contact that occur at substantially the same time).

Figure 5:
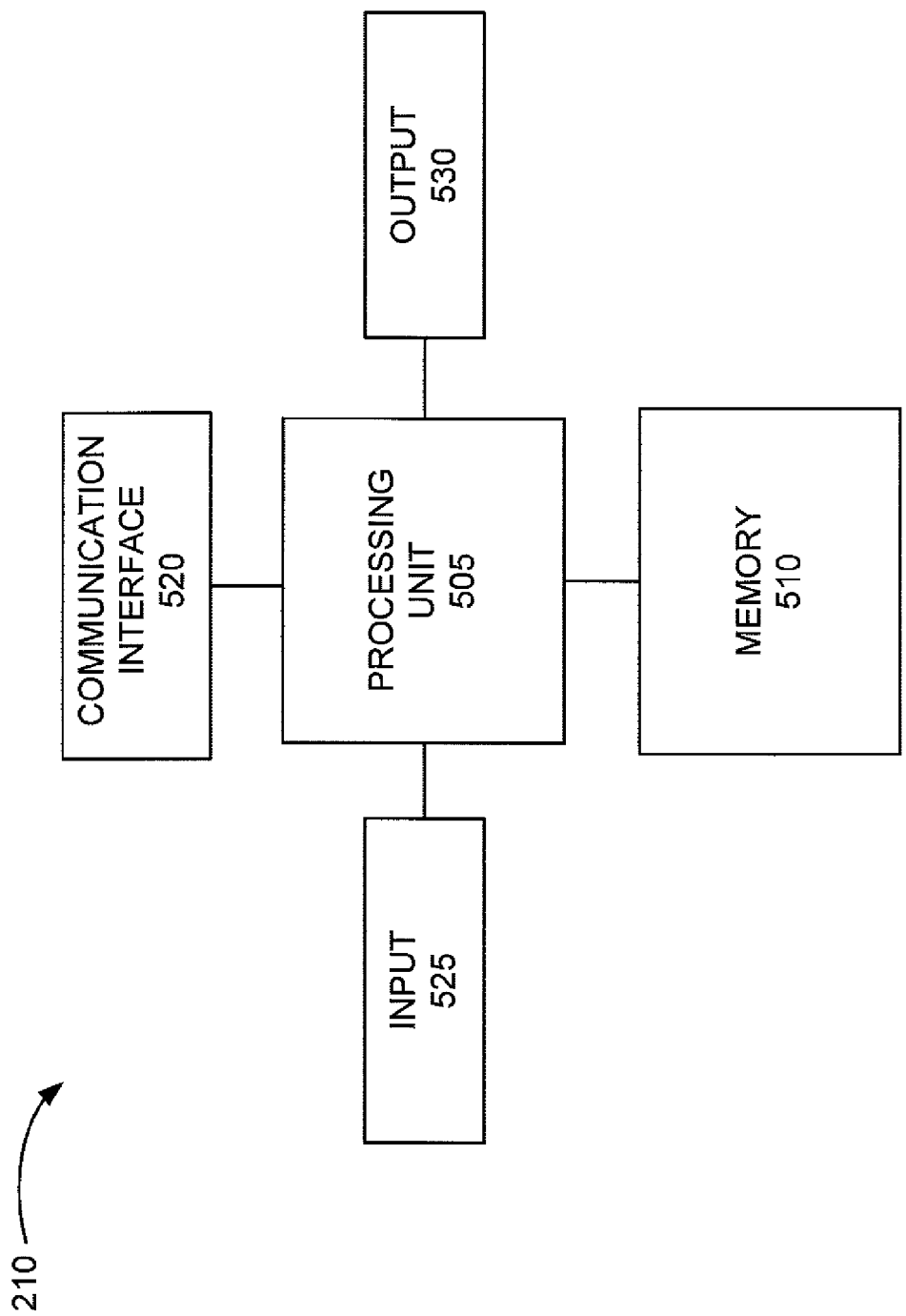
FIG. 5 is a diagram of example components of the mobile device of FIG. 4.

FIG. 5 is a diagram illustrating example components of mobile device 210. As illustrated, mobile device 210 may include a processing unit 505, a memory 510, a communication interface 520, an input component 525, and an output component 530. In another implementation, mobile device 210 may include fewer, additional, different, or differently arranged components than those illustrated in FIG. 5. Additionally, in other implementations, a function described as being performed by a particular component of mobile device 210 may be performed by a different component of mobile device 210.

Processing unit 505 may include one or more processors, microprocessors, data processors, co-processors, network processors, ASICs, controllers, programmable logic devices (PLDs), chipsets, FPGAs, or other components that may interpret or execute instructions or data. Processing unit 505 may control the overall operation, or a portion thereof, of mobile device 210, based on, for example, an operating system (not illustrated) and/or various applications. Processing unit 505 may access instructions from memory 510, from other components of mobile device 210, or from a source external to mobile device 210 (e.g., a network or another device).

Memory 510 may include memory or secondary storage. For example, memory 510 may include a RAM, a dynamic RAM (DRAM), a ROM, a programmable ROM (PROM), a flash memory, or some other type of memory. Memory 510 may include a hard disk (e.g., a magnetic disk, an optical disk, a magneto-optic disk, a solid state disk, etc.) or some other type of computer-readable medium, along with a corresponding drive. Memory 510 may store data, applications, or instructions related to the operation of mobile device 210. For example, memory 510 may include a variety of applications, such as a video content application, a navigation application, an e-mail application, a telephone application, a camera application, a voice recognition application, a multi-media application, a music player application, a visual voicemail application, a contacts application, a data organizer application, a calendar application, an instant messaging application, a texting application, a web browsing application, a blogging application, or other types of applications (e.g., a word processing application, a spreadsheet application, etc.). As described above, the video content application may permit a user to find video content of interest; purchase, rent, or subscribe to the video content; or play the video content.

Communication interface 520 may include a component that permits mobile device 210 to communicate with other devices (e.g., app server 220, license server 240, and/or content distribution server 260) or networks (e.g., wireless multicast system 205 or wireless unicast system 215). For example, communication interface 520 may include some type of wireless or wired interface. Communication interface 520 may also include an antenna (or a set of antennas) that permit wireless communication, such as the transmission and reception of radio frequency (RF) signals.

Input component 525 may include a component that permits a user or another device to input information into mobile device 210. For example, input component 525 may include a keypad, buttons (e.g., buttons 140), a switch, a knob, fingerprint recognition logic, retinal scan logic, a web cam, voice recognition logic, a touchpad, an input port, a microphone (e.g., microphone 410), a display (e.g., display 425), or some other type of input component.

Output component 530 may include a component that permits mobile device 210 to output information to the user or another device. For example, output component 530 may include a display (e.g., display 425), LEDs, an output port, a speaker (e.g., speaker 415), or some other type of output component.

As described herein, mobile device 210 may perform certain operations in response to processing unit 505 executing software instructions contained in a computer-readable medium, such as memory 510. The software instructions may be read into memory 510 from another computer-readable medium or from another device via communication interface 520. The software instructions contained in memory 510 may cause processing unit 505 to perform processes described herein. Alternatively, hardwired circuitry may be used in place of or in combination with software instructions to implement processes described herein. Thus, implementations described herein are not limited to any specific combination of hardware circuitry and software.

Figure 6:
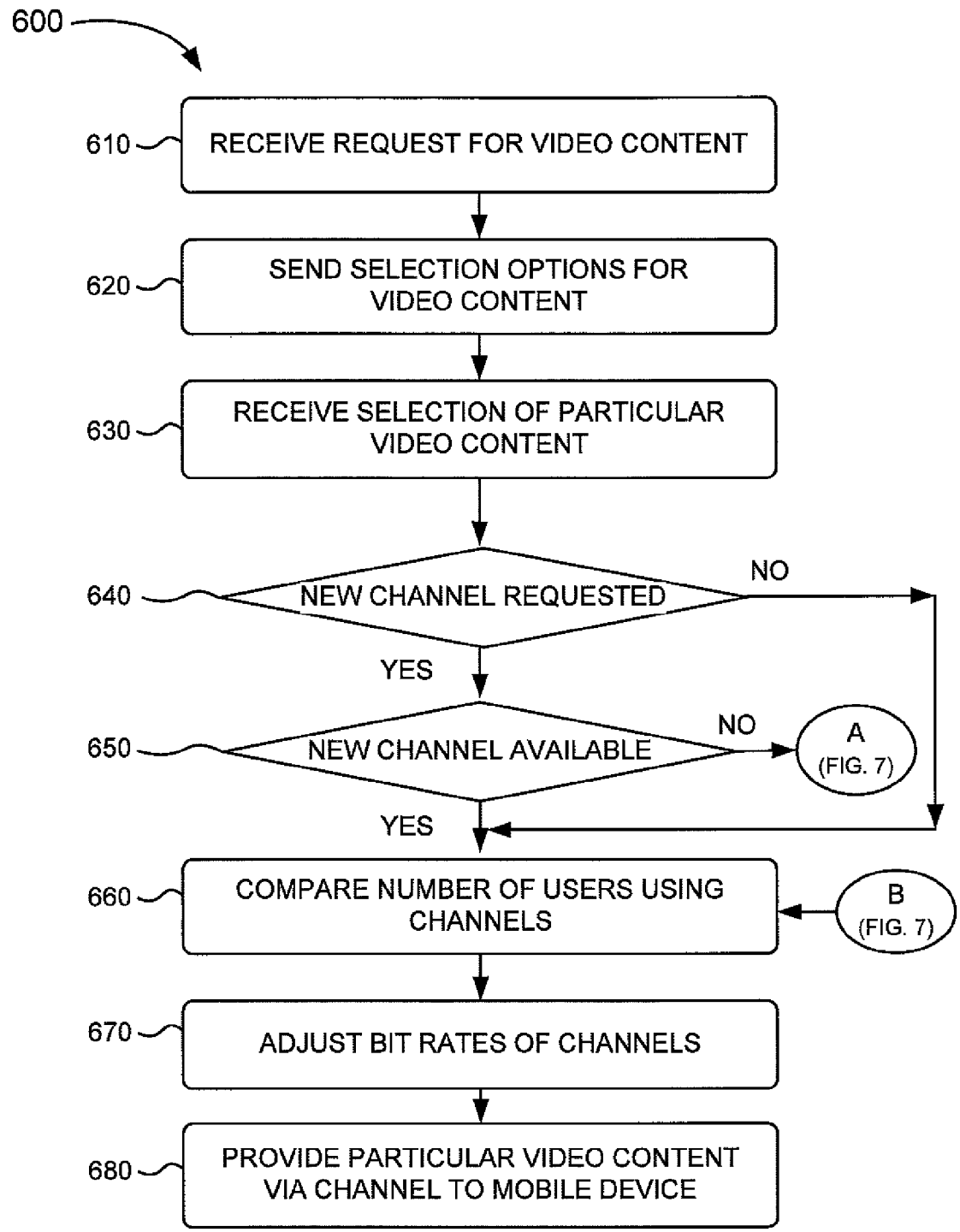
FIGS. 6 and 7 are a flowchart of an example process for obtaining video content according to an implementation.
Figure 7:
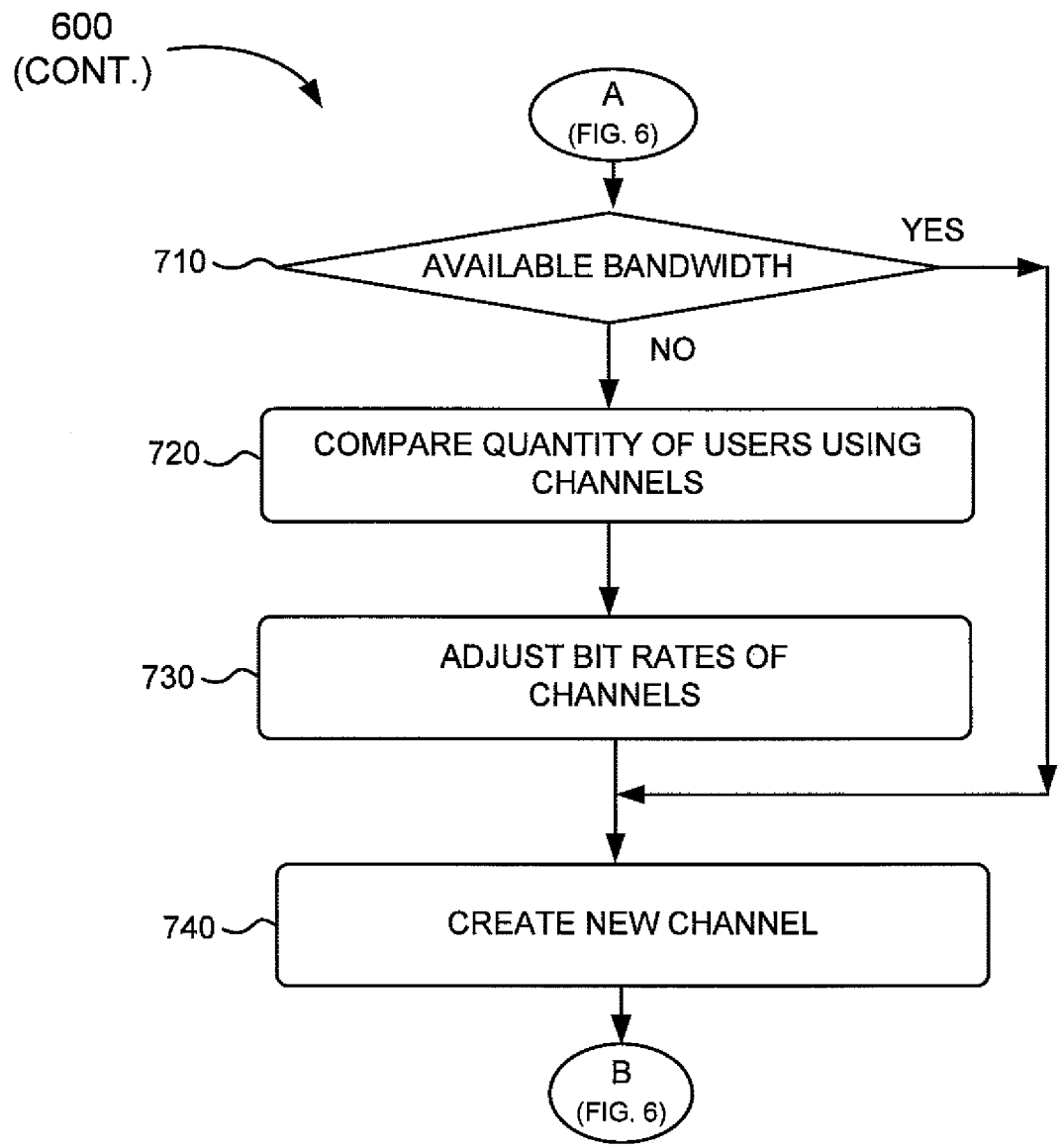

FIGS. 6 and 7 illustrate a flowchart of an example process 600 for obtaining video content. In one implementation, process 600 may be performed by one or more components of one or more servers 220, 230, 240, 250, or 260, such as processor 310 of app server 220. Process 600 will be described with corresponding references to examples illustrated in FIGS. 8-10, where a combination of unicast and multicast signals can be employed to implement process 600.

Process 600 may include receiving a request for video content (block 610). In one implementation, a server can receive a request for video content from a user of mobile device 210. For example, a user of mobile device 210 may activate a video content application in a standard manner, such as by selecting an icon (or another type of identifier) associated with the video content application, selecting the name of the video content application from a list, etc., where the activation of the video content application sends a request for video content to app server 220. The request for video content can be a wireless unicast signal received by app server 220.

Process 600 may include sending selection options for video content (block 620). In one implementation, a server can send a list of video content from which the user may select a video content item through interaction with a user interface. For example, app server 220 can send selection options to mobile device 210, where mobile device 210 can display a user interface with images representing certain available items, and where in conjunction with the user interface, selection of video content can occur through a standard way, such as by selecting one of the images representing certain items. The sending selection options for video content can be performed via wireless unicast, for example.

Process 600 may include receiving a selection with regard to particular video content (block 630). For example, an app server 220 can receive a signal, such as a wireless unicast signal 215A, from a mobile device 210, where the signal can indicate a selection of a particular video content.

Process 600 may include determining whether a new channel is requested to transmit the particular video content (block 640). In one implementation, the particular video content can be offered as a selection option, but not yet be assigned a channel such that a new channel could be assigned to the particular video content (block 640—YES). For example, a multicast bandwidth can include several multicast channels, where some of the multicast channels can be assigned to several video content specific channels, and other multicast channels can be unassigned until a new channel is requested. In another implementation, the particular video content can already have an assigned channel such that a new channel is not requested to provide the video content (block 640—NO).

Process 600 may include determining whether a new channel is available (block 650), assuming that a new channel is requested (block 640—YES). In one implementation, if the bandwidth has allocated channels that have not yet been assigned, then a channel would be available. For example, if there are a total of 100 channels allocated to the bandwidth and 50 channels are previously assigned, then 50 additional channels could be available in the bandwidth.

Process 600 may include determining whether there is available bandwidth for forming a new channel (block 710), as illustrated in FIG. 7, assuming that there are no available channels (block 650—NO). For example, as illustrated in FIG. 8, allocation of bandwidth for channels can be analyzed such that if there is available bandwidth that is not being utilized by current channels, then a new channel can be formed in this available portion of the bandwidth.

If there is available bandwidth (block 710—YES), process 600 may include creating a new channel (block 740). FIG. 8 includes diagrams of one implementation for forming a new channel when there is available bandwidth. In "A," a diagram of a finite sized bandwidth 810 is presented. Bandwidth 810 can be broader for certain wireless network technology, such as LTE, than for other wireless network technology, such as 3G, for example.

In "B," bandwidth 810 can include assigned channels 820 in assigned bandwidth 840, and can also include available bandwidth 830. Assigned channels 820 can be of any desired size that can fit within assigned bandwidth 840. Available bandwidth 830 can include bandwidth where channels have not been assigned. Assigned bandwidth 840 can include bandwidth where channels have been assigned to assigned channels 820.

Figure 8:
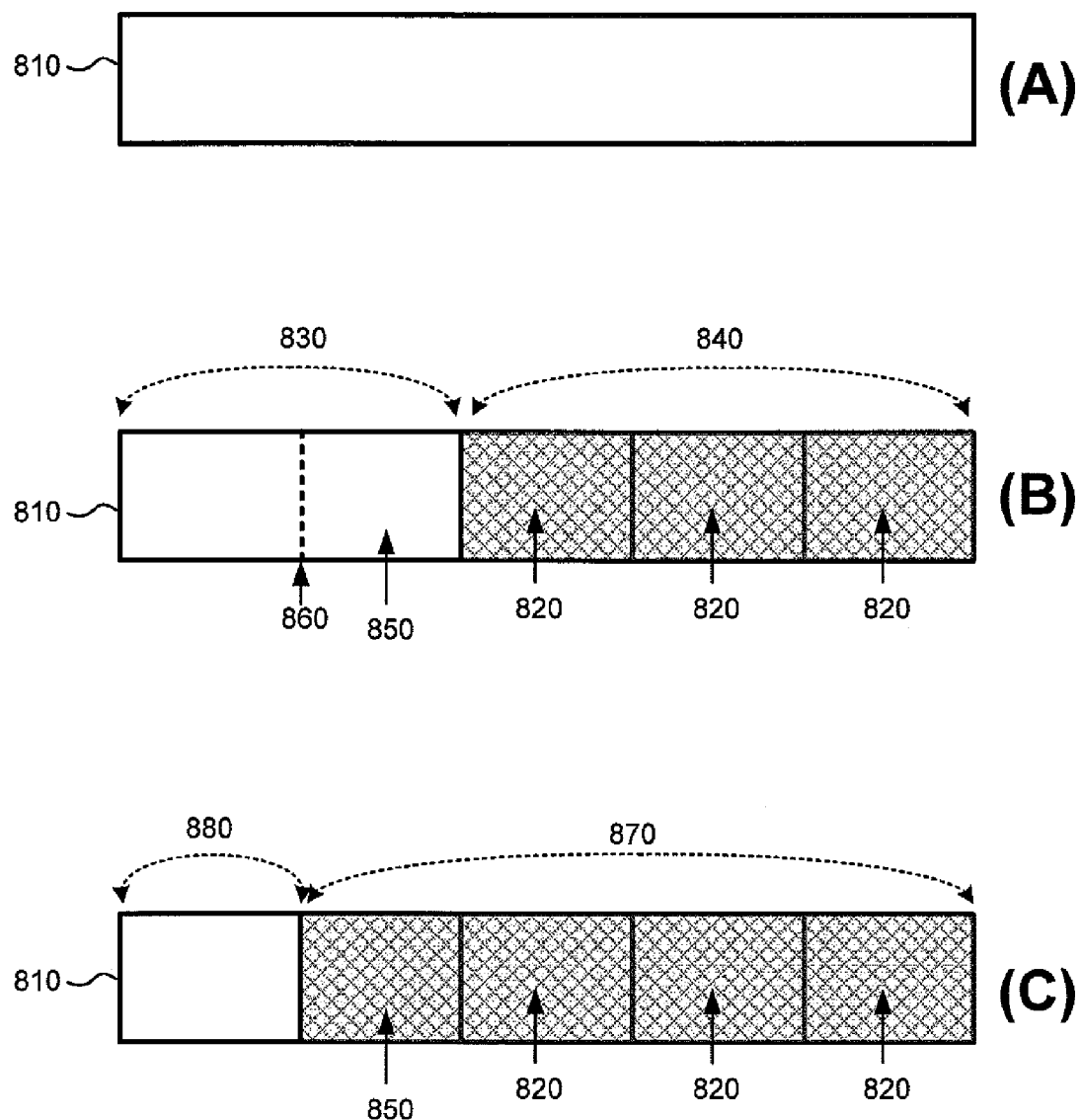
FIGS. 8-10 are diagrams of examples according to implementations described herein.

As illustrated in FIG. 8 "B," new channel 850 can be formed in available bandwidth 830. In one implementation, new channel 850 can be formed by partitioning 860 a portion of available bandwidth 830 to form new channel 850 of desired bandwidth or bit rate.

The number of channels in a bandwidth can be limited by the bandwidth or bit rate of each channel. For example, the bit rates can be preset to a predetermined portion of the bandwidth or a predetermined set bit rate per channel, a minimum bit rate per channel, or an adaptively adjustable bit rate per channel. The bit rate per channel can correlate to the quality available by the channel for the video content being transmitted. In one implementation, bandwidth 810 can have the ability to transmit 50 channels at a fixed bit rate per channel, and if 40 assigned channels 820 fill assigned bandwidth 840 (at the fixed bit rate per channel), then there can be available bandwidth 830 remaining for 10 more channels. For example, if a bandwidth is 100 megabits per second (Mbps), each channel is preset to 2 Mbps, and there are 40 assigned channels, then there could be 80 Mbps assigned to assigned channels and 20 Mbps available in the bandwidth.

In "C," as a result of partitioning 860 for new channel 850, bandwidth 810 can include revised assigned bandwidth 870 and revised available bandwidth 880. In one implementation, assigned channels 820 can remain at their previous bandwidths and new channel 850 can be assigned a similar bandwidth such that revised assigned bandwidth 870 can include four channels with bandwidth still available in revised available bandwidth 880. Alternatively, or additionally, the bandwidths for one or more of the channels can be variable and adjustable and can use any amount of bandwidth 810.

Returning to FIG. 7, if there is no available bandwidth (block 710—NO), process 600 may include comparing the quantity of users using channels (block 720). By comparing the quantity of users using individual channels, demand for the video content on each channel can be quantified.

Process 600 may include adjusting bit rates of channels (block 730). Bit rates of channels can be adjusted to increase bit rates of some channels and decrease bit rates on other channels. In one implementation, bit rates of channels with fewer users can be decreased in order to make bandwidth available for creating a new channel. For example, a user can request to start a new channel, and if the bandwidth has been used up, the bit rate and, thus, the quality of one or more existing channels can be lowered to free bandwidth for the new channel.

Figure 9:
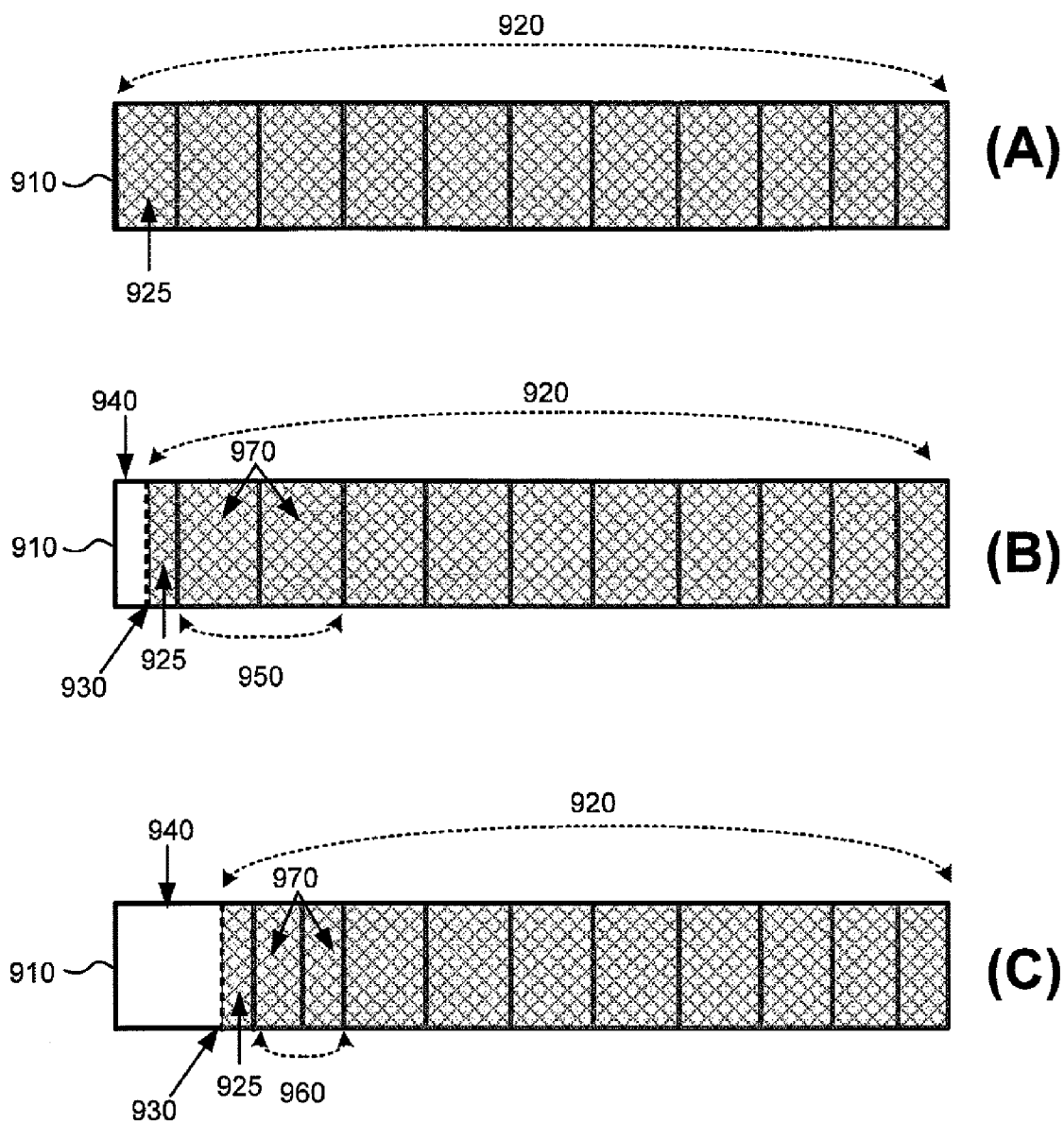

As illustrated in FIG. 9, a new channel can be created by adjusting the bit rates of other channels to make bandwidth available for the new channel. In "A," bandwidth 910 includes a fully assigned bandwidth with a set of channels occupying assigned bandwidth 920. In this example, there is no available bandwidth for adding a new channel as bandwidth 910 is occupied by assigned bandwidth 920. Also in this example, channel 925 has a bit rate similar to other channels in the bandwidth 910, but is emphasized here for illustrative purposes.

In "B," partition 930 can be formed to create new channel 940 by adjusting the bit rate of channel 925 to accommodate the bit rate of new channel 940. In other words, because bandwidth 910 was full of channels and a new channel 940 was requested, the bandwidth of channel 925 (or any other channel in the bandwidth 910) can be dynamically reduced in order to make bandwidth and bit rate available for the new channel 940.

Additionally, by providing an adjustment of bit rates of channels (block 730), if the quantity of users for a new channel is higher than for other channels, but the bit rate for the new channel is lower than for the other channels, then an allocation adjustment to increase the bit rate for the new channel and decrease the bit rate for the other channels may be done. For example, as illustrated in FIG. 9, in "C," allocation of bandwidth for new channel 940 may be increased, while a previously allocated bandwidth 950 in "B" may be decreased to bandwidth 960 in "C" to accommodate this change in bandwidth allocation for channels 970. Similarly, assigned bandwidth 920 can be decreased from "A" to "B" to "C," which can represent reducing the assigned bandwidth 920 for the channels previously assigned to bandwidth 910 in "A."

Returning to FIG. 6, assuming that there are available channels (block 650—YES), that a new channel was not requested (block 640—NO), or that a new channel was created (block 740) process 600 may include comparing the quantity of users using channels (block 660). By comparing the quantity of users using channels, demand for the video content on each channel can be quantified. For example, the quantity of purchasers, subscribers, or licensees to a first video content can be compared to the quantity of purchasers, subscribers, or licensees to a second video content to determine whether the first video content channel has more users than the second video content channel. In one implementation, the quantity of users for each channel, including a new channel, can be compared to determine demand for content in each channel.

Process 600 may include adjusting bit rates for channels (block 670). Bit rates can be adjusted to change the quality of the video content resolution. The bandwidth or bit rate per channel can correlate to the quality available by the channel for the video content being transmitted. In one implementation, channels can include different bit rates for low, medium, and high bit rates, where low bit rates can be for low resolution video content streaming, while high bit rates can be for high resolution video content streaming. For example, a low resolution channel can have a bit rate of 1 Mbps, while a high resolution channel can have a bit rate of 2 Mbps, where the resolution of the high resolution channel can include twice the data rate of the low resolution.

In one implementation, the bit rate can be adjusted based upon the quantity of users in order to provide the most quality to the most users, or based upon the demand as quantified by the quantity of users per channel. For example, for a channel with a high quantity of users, such as a popular new movie, the bit rate can be increased such that the resolution for the high quantity of users can be increased and the video content experience can be increased for more users.

Figure 10:
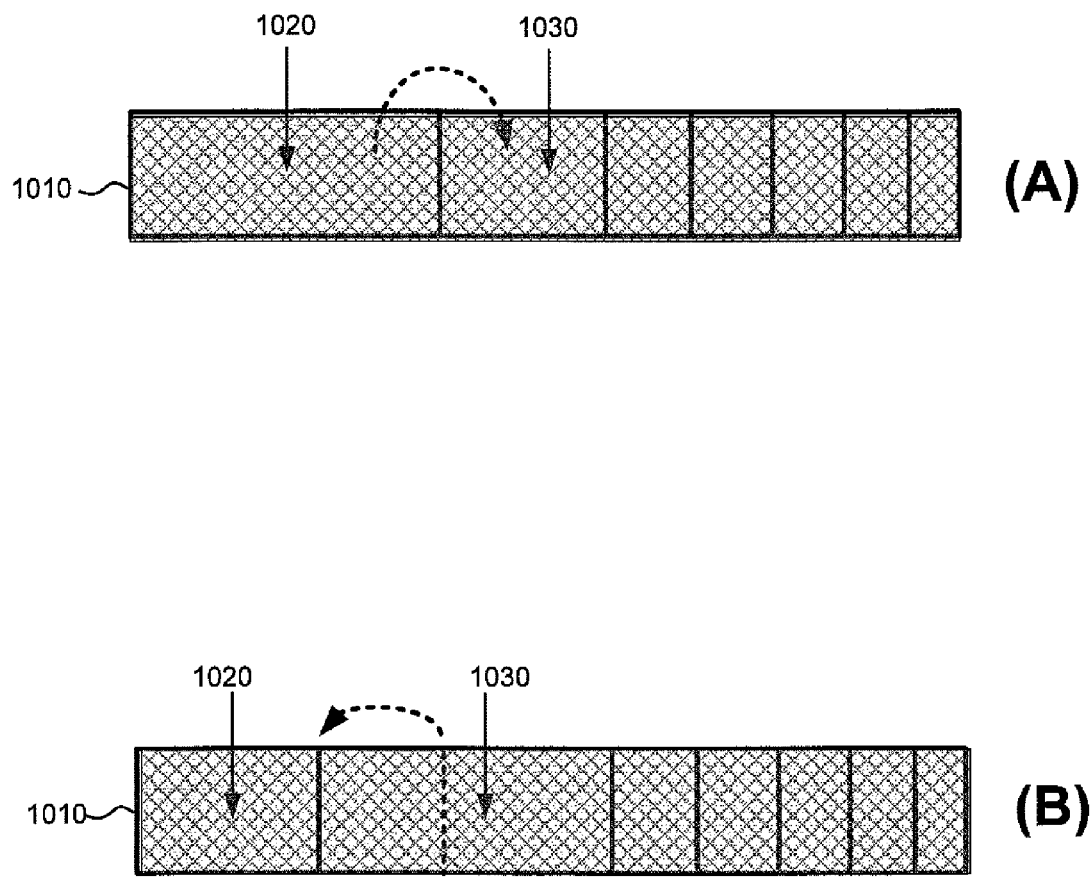

FIG. 10 is a diagram of an example implementation of adjusting bit rates (block 670). In FIG. 10, adjusting bit rates of channels is illustrated. In "A," bandwidth 1010 can be fully allocated with channels including a first channel 1020 and a second channel 1030. In one implementation, demand for the first channel 1020 can be changed into demand for the second channel 1030. For example, if users switch (e.g., quit) from the first channel 1020 to join the second channel 1030, then the demand for the first channel 1020 would decrease and the demand for the second channel 1030 would increase. This change in demand levels can cause the first channel 1020 and the second channel 1030 to adaptively adjust their channel sizes to provide more bandwidth or bit rate for second channel 1030 by taking the bandwidth from the first channel 1020, as illustrated in FIG. 10 in section "B."

In one implementation, the rebalancing or reallocating of the bandwidth can be done without interrupting the video content if the video content is already being provided. For example, the first channel 1020 can have decreased resolution while the second channel 1030 has increased resolution without any interruption of a stream of video content. By providing this implementation, increased QoE may be experienced by more users.

Process 600 may include providing (e.g., streaming) particular video content via a channel to mobile device 210 (block 680). For example, wireless multicast system 205 can transmit wireless multicast signals 205A over a channel to stream particular video content via the channel to mobile device 210.

The foregoing description provides illustration and description, but is not intended to be exhaustive or to limit the implementations to the precise form disclosed. Modifications and variations are possible in light of the above teachings or may be acquired from practice of the implementations.

For example, while series of blocks have been described with respect to FIGS. 6 and 7, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system, comprising:
one or more server devices to:
receive, by the one or more server devices and from a mobile device, an instruction to provide particular content;
determine, by the one or more server devices, that a new channel is requested to provide the particular content;
determine, by the one or more server devices, a first portion of bandwidth assigned to existing channels;
allocate, by the one or more server devices, a second portion of the bandwidth for the new channel, wherein, when allocating the second portion of the bandwidth for the new channel, the one or more server devices are configured to:
determine a first bandwidth demand for each of the existing channels;
determine a second bandwidth demand for the new channel;
compare the first bandwidth demand for each of the existing channels to the second bandwidth demand for the new channel; and
allocate portions of the first portion of the bandwidth to each of the existing channels and to the second portion of the bandwidth for the new channel based upon the first bandwidth demand for each of the existing channels relative to the second bandwidth demand for the new channel, where the second portion of the bandwidth is provided within the first portion of the bandwidth;
provide, by the one or more server devices, the new channel in the second portion of the bandwidth; and
provide, by the one or more server devices and to the mobile device, the particular content on the new channel.

2. The system of claim 1, where the one or more server devices determine the first bandwidth demand for each of the existing channels and the second bandwidth demand for the new channel by:
calculating a first quantity of mobile device provided instructions to provide the particular content for the new channel;
calculating a second quantity of mobile device provided instructions to provide other particular content for each of the existing channels; and
comparing the first quantity of mobile device provided instructions with the second quantity of mobile device provided instructions, where the first bandwidth demand for each of the existing channels is determined by the second quantity of mobile device provided instructions and the second bandwidth demand for the new channel is determined by the first quantity of mobile device provided instructions.

3. A method, comprising:
receiving, by a server and from a mobile device, an instruction to provide particular content;
determining, by the server, that a new channel is requested to provide the particular content;
determining, by the server, a first portion of bandwidth assigned to a plurality of existing channels;
determining, by the server, that bandwidth is not available for the new channel;
determining, by the server, demand for each existing channel, of the plurality of existing channels, relative to other existing channels, of the plurality of existing channels;
determining, by the server, demand for the new channel relative to the demand for each existing channel, of the plurality of existing channels, relative to other existing channels;
allocating, by the server, a second portion of the bandwidth, previously assigned to one or more of the plurality of existing channels, to the new channel, wherein allocating the second portion of the bandwidth comprises:
allocating portions of the first portion of the bandwidth previously assigned to the one or more of the plurality of existing channels to each of the existing channels and to the new channel based upon the demand for the new channel relative to the demand for each existing channel, wherein the second portion of the bandwidth for the new channel is provided within the first portion of the bandwidth previously assigned to the one or more of the plurality of existing channels; and providing, by the server and to the mobile device, the particular content on the new channel.

4. The method of claim 3, where the allocating the second portion of the bandwidth, previously assigned to the one or more of the plurality of existing channels, to the new channel includes:

decreasing bandwidth for the one or more of the plurality of existing channels to create available bandwidth, where the decreasing bandwidth for the one or more of the plurality of existing channels is based upon determining the demand for each existing channel, of the plurality of existing channels, relative to the other existing channels, of the plurality of existing channels, and demand for the new channel relative to the demand for each existing channel, of the plurality of existing channels.

5. The method of claim 3, where the determining the demand for the new channel relative to the demand for each existing channel, of the plurality of existing channels, includes:

calculating a first quantity of mobile device provided instructions to provide the particular content for the new channel;

calculating a second quantity of mobile device provided instructions to provide other particular content for each existing channel, of a plurality of existing channels; and comparing the first quantity of mobile device provided instructions to provide the particular content for the new channel with the second quantity of mobile device provided instructions to provide the other particular content for each existing channel, where the demand for the new channel and for each of the existing channels is determined based on the first and second quantity of mobile device provided instructions, respectively.

6. The method of claim 5, further comprising:

decreasing the bandwidth previously assigned to one or more existing channels, of the plurality of existing channels, that have a lower demand based on the second quantity of mobile device provided instructions for the one or more existing channels, of the plurality of existing channels, compared to the second quantity of mobile device provided instructions for one or more other existing channels, of the plurality of existing channels, that have a higher demand; and/or allocating the bandwidth previously assigned to the one or more of the existing channels, that have a lower demand, to the new channel.

7. A method, comprising:

receiving, by a server and from a mobile device, an instruction to provide particular content;

determining, by the server, whether the particular content corresponds to one of a plurality of existing channels;

determining, by the server, bit rates assigned to the plurality of existing channels;

determining, by the server, bandwidth demand for each of the plurality of existing channels;

determining, by the server, bandwidth demand for the particular content;

comparing, by the server, bandwidth demand for the particular content to the bandwidth demand for each of the plurality of existing channels;

allocating, by the server, a bit rate, previously assigned to one or more of the plurality of existing channels, from one or more of the plurality of existing channels to the particular content, wherein allocating the bit rate includes:

allocating portions of the bit rate previously assigned to the one or more of the plurality of existing channels to each of the existing channels and to the particular content based upon the bandwidth demand for each of the plurality of existing channels relative to the bandwidth demand for the particular content, wherein the portion of the bit rate for the particular content is provided within the portion of the bit rate previously assigned to the one or more of the plurality of existing channels; and providing, by the server and to the mobile device, the particular content.

8. The method of claim 7, where the determining whether the particular content corresponds to one of the plurality of existing channels includes determining that a new channel is requested to provide the particular content or determining that one of the plurality of existing channels provides the particular content.

9. The method of claim 7, where the comparing the bandwidth demand for the particular content to the bandwidth demand for each of the plurality of existing channels includes:

calculating a first quantity of mobile devices provided instructions to provide the particular content;

calculating a second quantity of mobile devices provided instructions to provide other particular content for each of the plurality of existing channels; and comparing the first quantity of mobile devices provided instructions with the second quantity of mobile devices provided instructions, where the bandwidth demand for the particular content and the bandwidth demand for each of the plurality of existing channels is determined by the first and the second quantity of mobile devices provided instructions, respectively.

10. The method of claim 7, where the allocating the bit rate, previously assigned to the one or more of the plurality of existing channels, from one or more of the plurality of existing channels to the particular content includes:

decreasing the bit rate for the one or more of the plurality of existing channels to create available bandwidth, where the decreasing the bit rate for the one or more of the plurality of existing channels is based upon determining that the demand for the one or more of the plurality of existing channels is less than the demand for the particular content.

11. The method of claim 10, where the allocating the bit rate, previously assigned to the one or more of the plurality of existing channels, from one or more of the plurality of existing channels to the particular content further includes:

increasing the bit rate for the particular content to use at least a portion of the available bandwidth, where increasing the bit rate for the particular content is based upon determining that the demand for the particular content is higher than the demand for the one or more of the plurality of existing channels from which the available bandwidth was created.

12. The method of claim 7, further comprising:

receiving an instruction to join one of the plurality of existing channels, where the demand for the one of the plurality of existing channels, that was joined, increases to reflect the join instruction.

13. The method of claim 12, further comprising:

receiving an instruction to quit one of the plurality of existing channels, where the demand for the one of the plurality of existing channels, that was quit, decreases to reflect the quit instruction.

14. The method of claim 7, further comprising repeating determining the bandwidth demand for each of the plurality of existing channels, determining bandwidth demand for the particular content, and allocating the bit rate repeat at regular time intervals.

15. The method of claim 7, where the receiving an instruction to provide particular content includes receiving a wireless unicast signal instruction; and where the providing the particular content includes wireless multicast streaming of the particular content to the mobile device.

16. A system comprising:
one or more processors configured to:
receive, from a mobile device, an instruction to provide particular content;
determine bit rates assigned to a plurality of existing channels;
determine bandwidth demand for each of the plurality of existing channels;
determine bandwidth demand for the particular content;
compare bandwidth demand for the particular content to the bandwidth demand for each of the plurality of existing channels;
allocate bit rate, previously assigned to one or more of the plurality of existing channels, from one or more of the plurality of existing channels to the particular content, wherein, when allocating the bit rate, the one or more processors are further configured to:
allocate portions of the bit rate previously assigned to the one or more of the plurality of existing channels to each of the existing channels and to the particular content based upon the bandwidth demand for each of the plurality of existing channels relative to the bandwidth demand for the particular content, wherein the portion of the bit rate for the particular content is provided within the portion of the bit rate previously assigned to the one or more of the plurality of existing channels; and
provide, to the mobile device, the particular content.

17. The system of claim 16, wherein the one or more processors are further configured to determine that a new channel is requested to provide the particular content or determining that one of the plurality of existing channels provides the particular content.

18. The system of claim 16, wherein, when comparing the bandwidth demand for the particular content to the bandwidth demand for each of the plurality of existing channels, the one or more processors are further configured to:

calculate a first quantity of mobile devices provided instructions to provide the particular content;
calculate a second quantity of mobile devices provided instructions to provide other particular content for each of the plurality of existing channels; and
compare the first quantity of mobile devices provided instructions with the second quantity of mobile devices provided instructions, wherein the bandwidth demand for the particular content and the bandwidth demand for each of the plurality of existing channels is determined by the first and the second quantity of mobile devices provided instructions, respectively.

19. The system of claim 16, wherein, when the allocating the bit rate, previously assigned to the one or more of the plurality of existing channels, from one or more of the plurality of existing channels to the particular content, the one or more processors are further configured to:

decrease the bit rate for the one or more of the plurality of existing channels to create available bandwidth, wherein the decreasing the bit rate for the one or more of the plurality of existing channels is based upon determining that the demand for the one or more of the plurality of existing channels is less than the demand for the particular content.

20. The system of claim 19, wherein, when allocating the bit rate, previously assigned to the one or more of the plurality of existing channels, from one or more of the plurality of existing channels to the particular content, the one or more processors are further configured to:

increase the bit rate for the particular content to use at least a portion of the available bandwidth, wherein increasing the bit rate for the particular content is based upon determining that the demand for the particular content is higher than the demand for the one or more of the plurality of existing channels from which the available bandwidth was created.

21. The system of claim 16, wherein the one or more processors are further configured to:

receive an instruction to join one of the plurality of existing channels, wherein the demand for the one of the plurality of existing channels, that was joined, increases to reflect the join instruction.

22. The system of claim 21, wherein the one or more processors are further configured to:

receive an instruction to quit one of the plurality of existing channels, wherein the demand for the one of the plurality of existing channels, that was quit, decreases to reflect the quit instruction.

* * * * *